US008976957B2

(12) United States Patent
Pavlov et al.

(10) Patent No.: US 8,976,957 B2
(45) Date of Patent: Mar. 10, 2015

(54) HEADSET MICROPHONE BOOM ASSEMBLY

(71) Applicant: Motorola Mobility LLC, Libertyville, IL (US)

(72) Inventors: Peter Pavlov, Duluth, GA (US); Peng Jiang, Lawrenceville, GA (US); Ryan Patrick Rye, Lawrenceville, GA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/028,986

(22) Filed: Sep. 17, 2013

(65) Prior Publication Data

US 2014/0341389 A1 Nov. 20, 2014

Related U.S. Application Data

(60) Provisional application No. 61/823,707, filed on May 15, 2013.

(51) Int. Cl.

*H04M 1/00* (2006.01)
*H04M 9/00* (2006.01)
*H04R 1/00* (2006.01)
*H04R 25/00* (2006.01)
*H04R 1/10* (2006.01)
*H04R 1/32* (2006.01)

(52) U.S. Cl.

CPC .............. *H04R 1/1075* (2013.01); *H04R 1/326* (2013.01)

USPC ........... 379/430; 381/375; 381/376; 381/384; 455/575.2

(58) Field of Classification Search

USPC .......... 381/370, 374, 375, 376, 384; 379/430; 455/575.2

See application file for complete search history.

(56) References Cited

U.S. PATENT DOCUMENTS

| | | | | |
|---|---|---|---|---|
| 4,917,504 | A * | 4/1990 | Scott et al. | 381/381 |
| 6,373,942 | B1 * | 4/2002 | Braund | 379/430 |
| 8,208,673 | B2 | 6/2012 | Graham et al. | |
| 8,737,666 | B2 * | 5/2014 | Saila et al. | 381/375 |
| 2005/0123157 | A1 | 6/2005 | Kragelund et al. | |
| 2011/0117975 | A1 * | 5/2011 | Dunn et al. | 455/575.1 |
| 2012/0275621 | A1 | 11/2012 | Elko | |

* cited by examiner

*Primary Examiner* — Tuan D Nguyen

(74) *Attorney, Agent, or Firm* — Leydig, Voit & Mayer, Ltd.

(57) ABSTRACT

The present arrangements relate to a microphone boom assembly. A first microphone can be positioned proximate to a first aperture defined in a first side of the microphone boom through which acoustic signals propagate to the first microphone, and a second microphone can be positioned proximate to a second aperture defined in a second side of the microphone through which the acoustic signals propagate to the second microphone. The first microphone can be connected to a first side of a flexible printed circuit at a first location and the second microphone connected to a second side of the flexible printed circuit at a second location, the flexible printed circuit mounted into the microphone boom with a bend in the flexible printed circuit positioned between the first location and the second location.

20 Claims, 4 Drawing Sheets

600

HEADSET MICROPHONE BOOM ASSEMBLY

CROSS-REFERENCE TO RELATED APPLICATIONS

This application claims the benefit of application No. 61/823,707, filed on May 15, 2013, which is fully incorporated herein by reference.

BACKGROUND OF THE INVENTION

Arrangements described herein relate to headsets and, more particularly, to headset microphone booms.

A headset typically includes one or two speakers mounted in a housing to be positioned adjacent a user's ear, or ears, and one or more microphones to detect spoken utterances produced by the user and optionally background noise. Some headsets are configured to communicate with audio devices or systems, such as mobile phones or computers, via wired connections. In other arrangements, headsets may be configured to communicate with such audio devices or systems via a wireless link, such as a Bluetooth® radio frequency link.

DETAILED DESCRIPTION

While the specification concludes with claims defining features of the embodiments described herein that are regarded as novel, it is believed that these embodiments will be better understood from a consideration of the description in conjunction with the drawings. As required, detailed arrangements of the present embodiments are disclosed herein; however, it is to be understood that the disclosed arrangements are merely exemplary of the embodiments, which can be embodied in various forms. Therefore, specific structural and functional details disclosed herein are not to be interpreted as limiting, but merely as a basis for the claims and as a representative basis for teaching one skilled in the art to variously employ the present embodiments in virtually any appropriately detailed structure. Further, the terms and phrases used herein are not intended to be limiting but rather to provide an understandable description of the present arrangements.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

Figure 1:
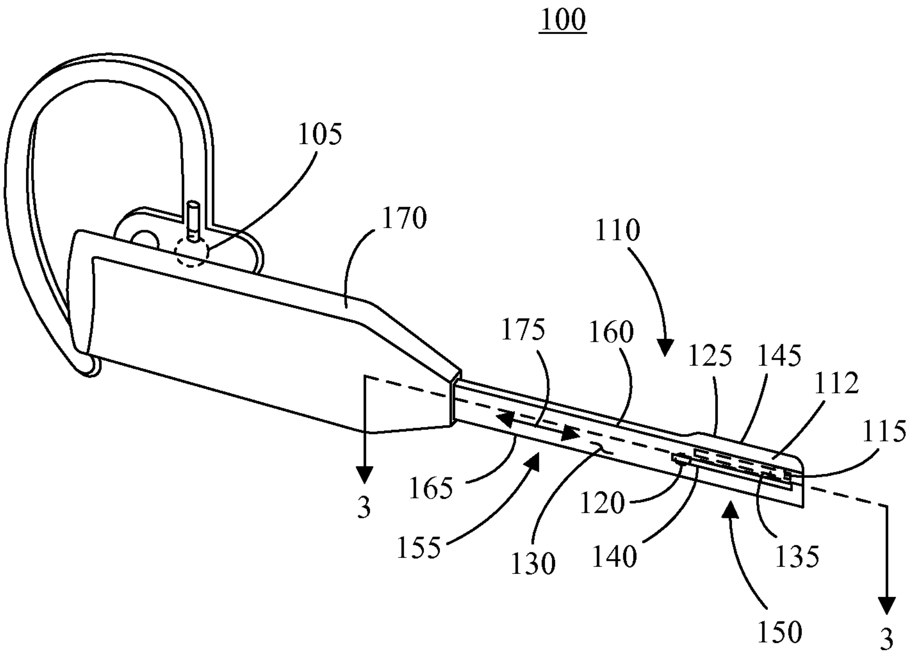
FIG. 1 depicts a headset, which is useful for understanding various arrangements described herein.

FIG. 1 depicts a headset 100, which is useful for understanding various arrangements described herein. The headset can be configured to communicate with audio devices or systems via a wired connection, a wireless link such as a Bluetooth® radio frequency (RF) link, a personal area network, or via any other suitable communication medium.

The headset 100 can include at least one audio transducer, such as a speaker 105 configured to be placed proximate to a user's ear. Further, the headset 100 can include a microphone boom assembly (hereinafter "boom") 110 comprising a boom housing 112 in which at least two microphone transducers (hereinafter "microphones") 115, 120 are mounted in a microphone chamber 145 defined at a distal portion 150 of the boom 110, the portion 150 being distal with respect to a body housing (e.g., a main housing) 170 of the headset 100. The distal portion 150 of the boom 110 can be wider than a near portion 155 of the boom 110 in order to accommodate the microphones 115, 120 within the microphone chamber 145 of the boom housing 112.

The first microphone 115 can be positioned proximate to a first aperture 135 defined in a first side 125 of the boom housing 112 where the microphone chamber 145 is located and the second microphone 120 can be positioned proximate to a second aperture 140 defined in a second side 130 of the boom housing 112 where the microphone chamber 145 is located. The second side 130 and the first side 125 can be on opposite sides of the chamber 145. In illustration, at least a portion of the second side 130 can be generally parallel to at least a portion of the first side 125. The first and second sides 125, 130 can be separated by a third side 160 and a fourth side 165, which four sides together define the boom housing 112, including the microphone chamber 145.

Acoustic signals can propagate to the first microphone 115 through the first aperture 135, and the first microphone 115 can be configured to detect such acoustic signals. Similarly, acoustic signals can propagate to the second microphone 120 through the second aperture 140, and the second microphone 120 can be configured to detect such acoustic signals. Accordingly, the first microphone 115 can primarily detect spoken utterances and other sounds generated by a user wearing the headset 100, and the second microphone 120 can detect background noise, which can be processed by a suitable processor or controller to implement noise cancelling functions.

The boom 110 can be substantially linear along the second side 130, or the boom 110 can be curved to place the first aperture 135 closer to the user's face. For example, the side 130 can be convex. Further, the near portion 155 of the boom 110 can be configured to slidably engage the body housing 170 of the headset 100. In this regard, the boom 110 can be selectively moved relative to the body housing 170 along an axis 175 between a retracted position and an extended position. In the retracted position, at least part of the near portion 155 of the boom 110 can retract into the body housing 170 of the headset 100. In the extended position, at least part of the near portion 155 of the boom can extend away from the body housing 170 of the headset 100. Thus, a user can slidably adjust the position of the boom 110 as desired.

Figure 2:
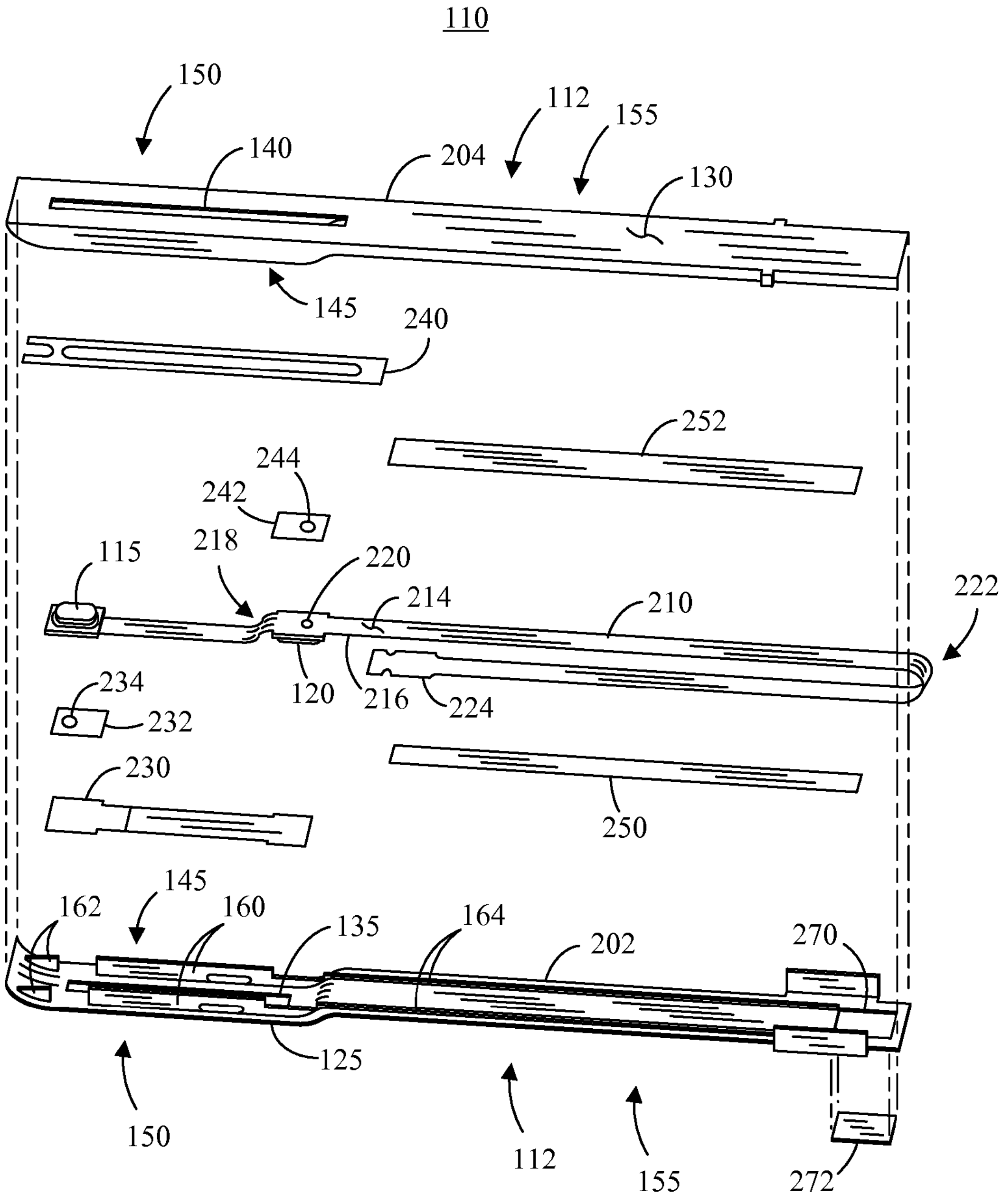
FIG. 2 depicts an enlarged exploded view of a microphone boom of the headset of FIG. 1, which is useful for understanding various arrangements described herein.

FIG. 2 depicts an enlarged exploded view of the boom 110 of FIG. 1, which is useful for understanding various arrangements described herein. The boom 110 can include first structural member 202 defining the first side 125 and a second structural member 204 defining the second side 130.

Together, the structural members 202, 204 can define the boom housing 112. The first structural member 202 can be made of metal, plastic or any other suitable material. The second structural member 204 also can be made of metal, plastic or any other suitable material. For example, the first structural member 202 can be made of injection molded plastic and the second structural member 204 can be made of injection molded metal. In one arrangement, the injection molded plastic can have a thickness of approximately 0.75 mm and the injection molded metal can have a thickness of approximately 0.6 mm, though the present arrangements are not limited in this regard.

The first aperture 135 can be defined in the first structural member 202 and the second aperture 140 can be defined in the second structural member 204. The first structural member 202 and/or the second structural member 204 can be configured in shape to define the microphone chamber 145 at the distal portion 150 of the boom 110 where the microphones 115, 120 are positioned within the boom 110.

The boom 110 further can include a flexible printed circuit (hereinafter "flex") 210 mounted between the first and second structural members 202, 204. The flex 210 can electrically connect the microphones 115, 120 to a suitable processor or controller of the headset 100 (FIG. 1), for example a processor or controller within the body housing 170 of the headset 100. The flex 210 can include a first side 214 and a second side 216. In one arrangement, printed circuit traces can be disposed on and/or or beneath both sides 214, 216 of a flex body. The second side 216 can be generally parallel and opposite to the first side 214. The flex 210 can be a flex strip having a body manufactured of at least one flexible dielectric substrate, such as a flexible polymer film, which in one arrangement, provides the thickness of the flex 210 (i.e., the distance between the sides 214, 216) to be approximately 0.15 mm, or thinner, though the present arrangements are not limited in this regard. In one arrangement, the flexible polymer film can be a polyamide film, which suitably withstands high temperatures applied during soldering processes used to connect components to the flex 210. In another arrangement, the flex 210 could be a rigid-flex circuit strip having a body manufactured of one or more rigid substrates, for example polytetrafluoroethylene, and one or more flexible substrates which are laminated into a semi-rigid structure in which one or more bends may be formed.

The first microphone 115 can be connected (e.g., both electrically connected and physically attached) to the first side 214 of the flex 210 at a first location and the second microphone 120 can be connected (e.g., both electrically connected and physically attached) to the second side 216 of the flex 210 at a second location. For example, the microphones 115, 120 can be soldered to the flex 115. In this regard, the first microphone 115 can be carried on the first side 214 of the flex 210 and the second microphone 120 can be carried on the second side 216 of the flex 210, thus creating a microphone assembly which is carried in the boom 110. Being flexible, the flex 210 can be bent to achieve a desired shape. For instance, the flex 210 can be mounted into the boom 110 with a bend 218 in the flex 210 positioned between the location where the first microphone 115 is connected to the flex 210 and the location where the second microphone 120 is connected to the flex 210. The bend 218 can be generally S-shaped.

Accordingly, even though the microphones 115, 120 may be connected to the respective opposite sides 214, 216 of the flex 210, and ported through opposite sides 125, 130 of the boom housing 112, the distance between the sides 125, 130 of the boom 110 where the microphone chamber 145 is located can be the same as the distance would be if only one microphone were used. Moreover, rather than requiring the use both of a bottom ported microphone and a top ported microphone, both microphones 115, 120 can be bottom ported or both microphones 115, 120 can be top ported. The exclusive use of bottom ported microphones, or the exclusive use of top ported microphones, allows the same microphone type to be used for both the microphones 115, 120. This can simplify tuning of audio signal processing algorithms used to implement noise cancelation, etc. The invention is not limited in this regard, however. For example, in other arrangements, the first microphone 115 can be bottom ported and the second microphone 120 can be top ported, or the first microphone 115 can be top ported and the second microphone 120 can be bottom ported.

A bottom ported microphone is a microphone configured to detect acoustic signals from a side of the microphone that connects the microphone to a printed circuit board. A top ported microphone is a microphone configured to detect acoustic signals from a side of the microphone opposite from the side that connects the microphone to a printed circuit board. Bottom ported microphones typically have a lower profile than top ported microphones. For example, one type of bottom ported microphone has a thickness of approximately 0.9 mm, while one type of top ported microphone has a thickness of approximately 1.1 mm. Nonetheless, microphones may be available with thinner profiles, and the present arrangements are not limited in this regard.

In the case that the microphones 115, 120 are bottom ported microphones, an aperture (302 of FIG. 3—not shown in FIG. 2) can be defined in the flex 210, aligned with an acoustic port of the first microphone 115, through which acoustic signals propagate to the first microphone 115. Such aperture can align with at least a portion of the aperture 135. Similarly, an aperture 220 can be defined in the flex 210, aligned with an acoustic port of the second microphone 120, through which acoustic signals propagate to the second microphone 120. The aperture 220 can align with at least a portion of the aperture 140. In the case that the microphones are top ported microphones, the apertures 302, 220 need not be defined in the flex 210.

The boom 110 further can include a first boom mesh 230 configured to allow flow of acoustic signals through the mesh, while keeping dust out of the first microphone 115. The first boom mesh 230 can be positioned between the first structural member 202 and a first adhesive 232. The first adhesive 232 can be configured to adhere the side 216 of the flex 210, at the location where the first microphone 115 is connected, to the first boom mesh 230, and thus to the first structural member 202. The first adhesive 232 can be positioned on the side 216 immediately opposite where the first microphone 115 is connected to the flex 210 on the side 214. An aperture 234 can be defined in the first adhesive 232 to allow passage of acoustic signals through the first adhesive 232 to the first microphone 115.

The boom 110 further can include a second boom mesh 240 configured to allow flow of acoustic signals through the mesh, while keeping dust out of the second microphone 120. The second boom mesh 240 can be positioned between the second structural member 204 and a second adhesive 242. The second adhesive 242 can be configured to adhere the side 214 of the flex 210, at the location where the second microphone 120 is connected, to the second boom mesh 240, and thus to the second structural member 204. An aperture 244 can be defined in the second adhesive 242 to allow passage of acoustic signals through the second adhesive 242 to the second microphone 120. A third adhesive 250 can be provided to attach the second side 216 of the flex 210 to the first structural member 202. Similarly, a fourth adhesive 252 can be provided to attach the first side 214 of the flex 210 to the second structural member 204.

The flex 210 can be mounted into the boom 110 with a generally U-shaped bend 222, allowing the flex 210 to bend around the first structural member 202 and connect to a connector in the body housing 170 of the headset 100 (FIG. 1) that provides an electrical connection to the processor or controller. In illustration, an end portion 224 of the flex 210 can be configured to engage the connector. The U-shaped bend 222 allows boom 110 to be moved between the retracted position and the extended position while the flex 210 maintains connection to the connector, and thus the processor or controller. In this regard, the U-shaped bend 222 is not stationary on the flex 210. As the boom 110 is extended or retracted, the flex 210 can adjust accordingly.

Various tabs (or ribs) 160, 162 can be defined on the first structural member 202 to guide positioning of the various components 115, 120, 210, 230, 232, 240, 242 within the microphone chamber 145. Similarly, various tabs (or ribs) 164 can be defined on the first structural member 202 to guide positioning of the flex 210 in the near portion 155 of the boom 110.

An aperture 260 can be defined in the first structural member 202 into which a magnet 272 may be inserted. The magnet 272 can provide a level of resistance between the boom 110 and the body housing 170 (shown in FIG. 1) to hold the boom 110 into a desired position when the position of the boom 110 is adjusted with respect to the body housing 170. The magnet 272 also can trigger a Hall effect sensor (not shown) to generate one or more signals processed by a processor (or controller) to determine the position of the boom 110 with respect to the body housing 170.

Figure 3:
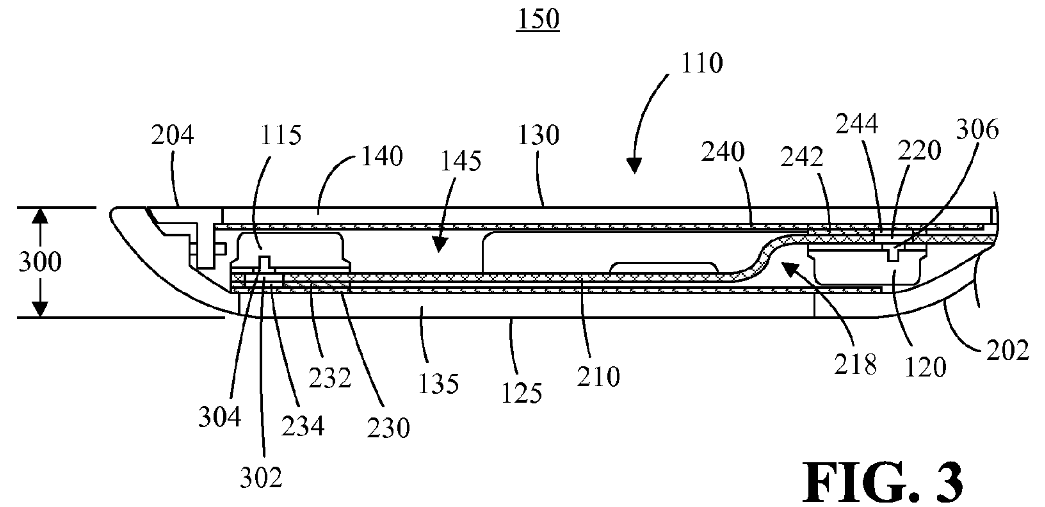
FIG. 3 depicts an enlarged section view of a distal portion of the microphone boom of the headset of FIG. 1, taken along section line 3-3, in accordance with one arrangement described herein.

FIG. 3 depicts an enlarged section view of the distal portion 150 of the boom 110 of FIG. 1, taken along section line 3-3, in accordance with one arrangement described herein. As noted, the distal portion 150 is the portion of the boom 110 defining the microphone chamber 145, and the various components 115, 120, 210, 230, 232, 240, 242 can be positioned within the microphone chamber 145 defined between the first structural member 202 and the second structural member 204. FIG. 3 further depicts the aperture 302 in the flex 210 not shown in FIG. 2.

In the arrangement depicted in FIG. 3, the microphones 115, 120 are bottom ported microphones. In illustration, an acoustic port 304 can be defined in the first microphone 115 to receive acoustic signals, and an acoustic port 306 can be defined in the second microphone 120 to receive acoustic signals. The aperture 302 in the flex 210 can be aligned with the acoustic port 304 of the first microphone 115, and the aperture 244 defined in the flex 210 can be aligned with the acoustic port 306 of the second microphone 120.

The flex 210 can be mounted into the boom 110 with a bend 218, for example a generally S-shaped bend, formed in the flex 210 and positioned between the location where the first microphone 115 is connected to the flex 210 and the location where the second microphone 120 is connected to the flex 210. A portion of the flex 210 where the first microphone 115 is connected to the flex 210 can be positioned between the first microphone 115 and the first structural member 202, for example between the first microphone 115 and the first adhesive 232. Similarly, a portion of the flex 210 where the second microphone 120 is connected to the flex 210 can be positioned between the second microphone 120 and the second structural member 204, for example between the first microphone 115 and the second adhesive 242.

In one arrangement, the thickness 300 of the distal portion 150 of the boom 110, between the opposing sides 125, 130, can be equal to or less than approximately 2.8 mm, which is less than one-half of the width of a conventional boom which uses two microphones ported through opposing sides of the boom. The present arrangements are not limited to the dimension, however.

Figure 4:
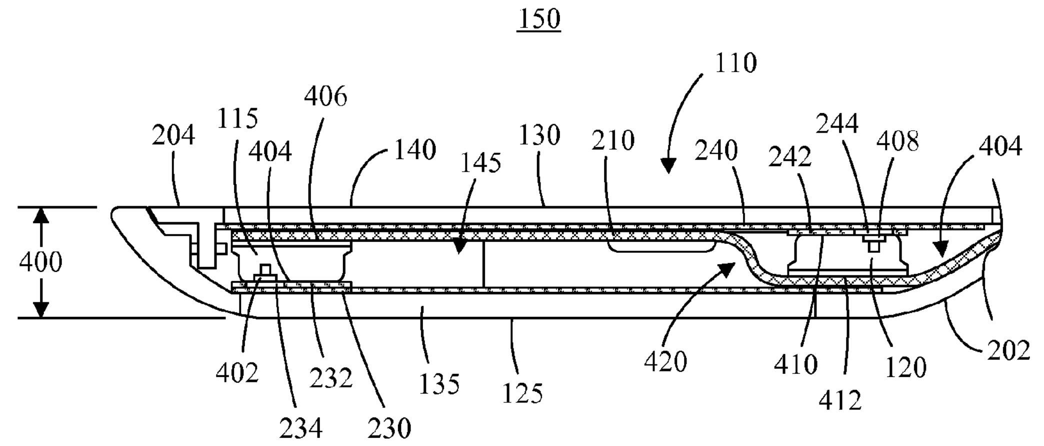
FIG. 4 depicts an enlarged section view of a distal portion of the microphone boom of the headset of FIG. 1, taken along section line 3-3, in accordance with another arrangement described herein.

FIG. 4 depicts an enlarged section view of the distal portion 150 of the boom 110 of FIG. 1, taken along section line 3-3, in accordance with another arrangement described herein. As noted, the distal portion 150 is the portion of the boom 110 defining the microphone chamber 145, and the various components 115, 120, 210, 230, 232, 240, 242 can be positioned within the microphone chamber 145 defined between the first structural member 202 and the second structural member 204.

In the arrangement depicted in FIG. 4, the microphones 115, 120 are top ported microphones. Since the microphones 115, 120 are top ported, apertures need not be defined in the flex 210 to pass acoustic signals to the microphones 115, 120. Instead, an acoustic port 402 can be defined in a first side 404 of the first microphone 115 opposing a second side 406 of the first microphone 115 connecting the first microphone 115 to the flexible printed circuit board 210. Similarly, an acoustic port 408 can be defined in a first side 410 of the second microphone 120 opposing a second side 412 of the second microphone 120 connecting the second microphone 120 to the flexible printed circuit board 210, Again, the flex 210 can be mounted into the boom 110 with a bend 420, such as a generally S-shaped bend, formed in the flex 210 and positioned between the location where the first microphone 115 is connected to the flex 210 and the location where the second microphone 120 is connected to the flex 210. In contrast to FIG. 3, a portion of the flex 210 where the first microphone 115 is connected to the flex 210 can be positioned between the first microphone 115 and the second structural member 204, for example between the first microphone 115 and the second boom mesh 240. Similarly, a portion of the flex 210 where the second microphone 120 is connected to the flex 210 can be positioned between the second microphone 120 and the first structural member 202, for example between the first microphone 115 and the first boom mesh 230. The flex 210 can be mounted into the boom 110 with another bend 404 following the contour of the first structural member 202.

The first adhesive 232 can adhere the first microphone 115 to the first boom mesh 230, and thus to the first structural member 202. The second adhesive 242 can adhere the second microphone 120 to the second boom mesh 240, and thus to the second structural member 204. In one arrangement, the thickness 400 of the distal portion 150 of the boom 110, between the opposing sides 125, 130, can be equal to or less than approximately 3.0 mm. The present arrangements are not limited to this dimension, however.

Figure 5:
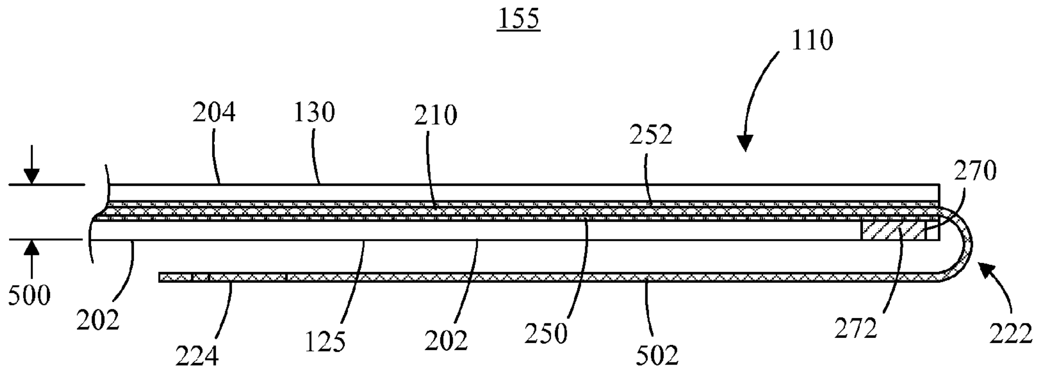
FIG. 5 depicts an enlarged section view of a near portion of the microphone boom of the headset of FIG. 1, taken along section line 3-3, which is useful for understanding various arrangements described herein.

FIG. 5 depicts an enlarged section view of the near portion 155 of the boom 110 of FIG. 1, taken along section line 3-3, which is useful for understanding various arrangements described herein. In the near portion 155 of the boom, the flex 210 can be positioned between the first structural member 202 and the second structural member 204. The flex 210 can be adhered to the first structural member using the third adhesive 250 and adhered to the second structural member using the fourth adhesive 252. The thickness 500 of the near portion 155 of the boom 110, between the sides 125, 130, can be equal to or less than approximately 1.7 mm, though the present arrangements are not limited in this regard.

As noted, a magnet 272 can be positioned within the aperture 270, and can trigger a Hall effect sensor (not shown) to allow the controller or processor to determine the position of the boom 110. Specifically, as the magnet 272 moves past a portion 502 of the flex 210 external to the boom 110 when the boom 100 is moved relative to the body housing 170 of the headset 100 (FIG. 1), the magnetic field generated by the magnet 272 can induce a signal on one or more circuit traces in the portion 502 of the flex 210. This signal can be detected by the Hall effect sensor and processed to determine the position of the boom 110 with respect to the body housing 170 of the headset 100.

Figure 6:
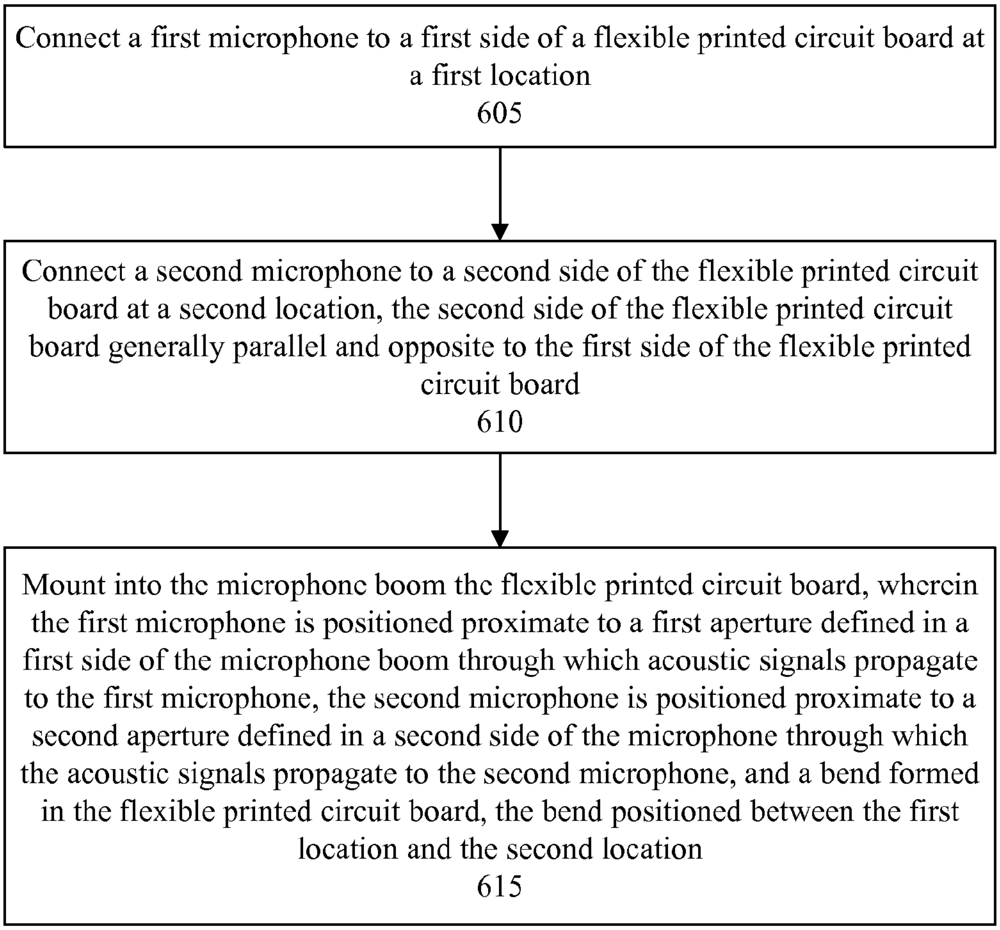
FIG. 6 is a flowchart presenting a method of assembling a boom, which is useful for understanding various arrangements described herein.

FIG. 6 is a flowchart presenting a method 600 of assembling a boom, which is useful for understanding various arrangements described herein. At step 605, a first microphone can be connected to a first side of a flexible printed circuit board at a first location. At step 610, a second microphone can be connected to a second side of the flexible printed circuit board at a second location, the second side of the flexible printed circuit board generally parallel and opposite to the first side of the flexible printed circuit board. At step 615, the flexible circuit board can be mounted into the microphone boom, wherein the first microphone is positioned proximate to a first aperture defined in a first side of the microphone boom through which acoustic signals propagate to the first microphone, the second microphone is positioned proximate to a second aperture defined in a second side of the microphone through which the acoustic signals propagate to the second microphone, and a bend is formed in the flexible printed circuit board, the generally bend positioned between the first location and the second location.

Like numbers have been used to refer to the same items throughout this specification. The terminology used herein is for the purpose of describing particular embodiments only and is not intended to be limiting of the invention. The terms "a" and "an," as used herein, are defined as one or more than one. The term "plurality," as used herein, is defined as two or more than two. The term "another," as used herein, is defined as at least a second or more. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

Reference throughout this specification to "one arrangement," "an arrangement," or similar language means that a particular feature, structure, or characteristic described in connection with the embodiment is included in at least one arrangement disclosed within this specification. Thus, appearances of the phrases "in one arrangement," "in an arrangement," and similar language throughout this specification may, but do not necessarily, all refer to the same arrangement.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

These embodiments can be embodied in other forms without departing from the spirit or essential attributes thereof. Accordingly, reference should be made to the following claims, rather than to the foregoing specification, as indicating the scope of the embodiments.

What is claimed is:

1. A microphone boom assembly comprising:

a first microphone to be positioned proximate to at least one first aperture in a first side of a microphone boom, acoustic signals to propagate to the first microphone through the at least one first aperture, and a second microphone to be positioned proximate to at least one second aperture in a second side of the microphone boom, acoustic signals to propagate to the second microphone through the at least one second aperture; and a flexible printed circuit comprising a first side and a second side, the second side of the flexible printed circuit generally parallel and opposite to the first side of the flexible printed circuit, the first microphone connected to the first side of the flexible printed circuit at a first location and the second microphone connected to the second side of the flexible printed circuit at a second location, the flexible printed circuit to be mounted into the microphone boom with a bend in the flexible printed circuit, the bend positioned between the first location and the second location.

2. The microphone boom of claim 1, wherein:

the first microphone is bottom ported and a third aperture is defined in the flexible printed circuit, to be aligned with an acoustic port of the first microphone, through which the acoustic signals propagate to the first microphone; and the second microphone is bottom ported and a fourth aperture is defined in the flexible printed circuit board, aligned with an acoustic port of the second microphone, through which the acoustic signals propagate to the second microphone.

3. The microphone boom of claim 2, wherein a portion of the microphone boom in which a microphone is positioned has a thickness of approximately 2.8 mm.

4. The microphone boom of claim 1, wherein:

the first microphone is top ported, an acoustic port of the first microphone defined in a first side of the first microphone opposing a second side of the first microphone connecting the first microphone to the flexible printed circuit board; and the second microphone is top ported, an acoustic port of the second microphone defined in a first side of the second microphone opposing a second side of the second microphone connecting the second microphone to the flexible printed circuit board.

5. The microphone boom of claim 4, wherein a portion of the microphone boom in which the microphones are positioned has a thickness of approximately 3.0 mm.

6. The microphone boom of claim 1, wherein the microphone boom is configured to slidably engage a housing of a headset, the microphone boom selectively moveable between a retracted position in which at least part of a near portion of the microphone boom tracts into the housing of the headset and an extended position in which the part of the near portion of the microphone boom at least partially extends away from the housing of the headset.

7. The microphone boom of claim 6, wherein the near portion of the microphone boom has a thickness of approximately 1.7 mm.

8. The microphone boom of claim 6, further comprising:
- a magnet positioned in the near portion of the microphone boom, the magnet triggering a Hall effect sensor to generate at least one signal processed by a processor or controller to determine a position of the microphone boom with respect to the housing of the headset.

9. A headset comprising:
- a main housing;
- a microphone boom comprising a boom housing, the boom housing extending from the main housing and including a first aperture on a first side and a second aperture on a second side; and
- a microphone assembly, the microphone assembly including a first microphone, a second microphone, and a flexible printed circuit, the flexible printed circuit comprising a first side and a second side, the second side of the flexible printed circuit generally parallel and opposite to the first side of the flexible printed circuit, the first microphone carried on the first side of the flexible printed circuit, and the second microphone carried on the second side of the flexible printed circuit;
- the microphone assembly carried in the microphone boom with the first microphone proximate to a first aperture in a first side of the microphone boom housing, acoustic signals for the first microphone to propagate through the first aperture, the second microphone positioned proximate to a second aperture in a second side of the microphone boom housing, acoustic signals for the second microphone to propagate through the second aperture, the flexible printed circuit carried in the microphone boom housing with a bend in the flexible printed circuit board, the bend positioned between the first location and the second location.

10. The headset of claim 9, wherein:
- the first microphone is bottom ported and a third aperture is defined in the flexible printed circuit board, aligned with an acoustic port of the first microphone, through which the acoustic signals propagate to the first microphone; and
- the second microphone is bottom ported and a fourth aperture is defined in the flexible printed circuit board, aligned with an acoustic port of the second microphone, through which the acoustic signals propagate to the second microphone.

11. The headset of claim 10, wherein a portion of the microphone boom in which the microphones are positioned has a thickness of approximately 2.8 mm.

12. The headset of claim 9, wherein:
- the first microphone is top ported, an acoustic port of the first microphone defined in a first side of the first microphone opposing a second side of the first microphone connecting the first microphone to the flexible printed circuit board; and
- the second microphone is top ported, an acoustic port of the second microphone defined in a first side of the second microphone opposing a second side of the second microphone connecting the second microphone to the flexible printed circuit board.

13. The headset of claim 12, wherein a portion of the microphone boom in which the microphones are positioned has a thickness of approximately 3.0 mm.

14. The headset of claim 9, wherein the microphone boom is configured to slidably engage a housing of the headset, the microphone boom selectively moveable between a retracted position in which at least part of a near portion of the microphone boom tracts into the housing of the headset and an extended position in which the part of the near portion of the microphone boom at least partially extends away from the housing of the headset.

15. The headset of claim 14, wherein the near portion of the microphone boom has a thickness of approximately 1.7 mm.

16. The headset of claim 14, further comprising:
- a magnet positioned in an aperture defined in the near portion of the microphone boom, the magnet triggering a Hall effect sensor to generate at least one signal processed by a processor or controller to determine a position of the microphone boom with respect to the housing of the headset.

17. A method of assembling a microphone boom comprising:
- connecting a first microphone to a first side of a flexible printed circuit board at a first location;
- connecting a second microphone to a second side of the flexible printed circuit board at a second location, the second side of the flexible printed circuit board generally parallel and opposite to the first side of the flexible printed circuit board; and
- mounting into the microphone boom the flexible printed circuit board, wherein the first microphone is positioned proximate to a first aperture defined in a first side of the microphone boom through which acoustic signals propagate to the first microphone, the second microphone is positioned proximate to a second aperture defined in a second side of the microphone through which the acoustic signals propagate to the second microphone, and a bend formed in the flexible printed circuit board, the bend positioned between the first location and the second location.

18. The method of claim 17, wherein:
- the first microphone is bottom ported and a third aperture is defined in the flexible printed circuit board, aligned with an acoustic port of the first microphone, through which the acoustic signals propagate to the first microphone; and
- the second microphone is bottom ported and a fourth aperture is defined in the flexible printed circuit board, aligned with an acoustic port of the second microphone, through which the acoustic signals propagate to the second microphone.

19. The method of claim 17, wherein:
- the first microphone is top ported, an acoustic port of the first microphone defined in a first side of the first microphone opposing a second side of the first microphone connecting the first microphone to the flexible printed circuit board; and
- the second microphone is top ported, an acoustic port of the second microphone defined in a first side of the second microphone opposing a second side of the second microphone connecting the second microphone to the flexible printed circuit board.

20. The method of claim 17, wherein the microphone boom is configured to slidably engage a housing of a headset, the microphone boom selectively moveable between a retracted position in which at least part of a near portion of the microphone boom tracts into the housing of the headset and an extended position in which the part of the near portion of the microphone boom at least partially extends away from the housing of the headset.

* * * * *